United States Patent
Young, III et al.

(10) Patent No.: US 9,919,684 B2
(45) Date of Patent: Mar. 20, 2018

(54) WINDSCREEN WIPER DEVICE

(71) Applicant: Federal-Mogul Motorparts Corporation, Southfield, MI (US)

(72) Inventors: William D. Young, III, Waterford, MI (US); Dennis E. Cox, Belleville, MI (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 535 days.

(21) Appl. No.: 14/535,073

(22) Filed: Nov. 6, 2014

(65) Prior Publication Data
US 2015/0121644 A1     May 7, 2015

Related U.S. Application Data

(60) Provisional application No. 61/900,667, filed on Nov. 6, 2013.

(51) Int. Cl.
     *B60S 1/38*      (2006.01)

(52) U.S. Cl.
CPC ............. *B60S 1/3848* (2013.01); *B60S 1/381* (2013.01); *B60S 1/3879* (2013.01); *B60S 1/3881* (2013.01); *B60S 1/3889* (2013.01); *B60S 1/3894* (2013.01)

(58) Field of Classification Search
CPC ...... B60S 1/381; B60S 1/3881; B60S 1/3808; B60S 1/3806; B60S 1/3848
USPC .................................................... 15/250.201
See application file for complete search history.

(56) References Cited

U.S. PATENT DOCUMENTS

| 7,228,588 B2 * | 6/2007 | Kraemer ................. B60S 1/381 15/250.201 |
| 7,461,429 B2 | 12/2008 | Huang |

(Continued)

FOREIGN PATENT DOCUMENTS

| DE | 102009028910 A1 | 2/2011 |
| WO | 2006069648 A1 | 7/2006 |

(Continued)

OTHER PUBLICATIONS

International Search Report, dated Jan. 19, 2015 (PCT/US2014/064387).

*Primary Examiner* — Gary Graham
(74) *Attorney, Agent, or Firm* — Robert L. Stearns; Dickinson Wright, PLLC (57) ABSTRACT

The windscreen wiper device includes a longitudinally extending wiper element which is made of an elastic rubber or rubber-like material. A carrier supports the wiper element and is curved in a longitudinal direction to bias the wiper element into a curved shape. A connecting device is engaged with the carrier for connection with a wiper arm. End caps are disposed at opposite longitudinal ends of the carrier and are spaced longitudinally from the connecting device. A pair of subspoilers are disposed on opposite longitudinal sides of the connecting device. Each of the subspoilers includes a bottom, front and back walls which bound an open interior and two reinforcing members which extend through the open interior and divide the open interior into at least two chambers for reinforcing the front and back walls. The front, back and bottom walls and the reinforcing members are all formed as one integral piece.

14 Claims, 5 Drawing Sheets

(56) References Cited

U.S. PATENT DOCUMENTS

| | | | |
|---|---|---|---|
| D592,121 S | 5/2009 | Bratec et al. | |
| 7,540,061 B1 * | 6/2009 | Huang | B60S 1/3881 15/250.201 |
| 7,644,483 B2 | 1/2010 | Thomar et al. | |
| 7,698,775 B2 | 4/2010 | Lee | |
| 8,020,246 B2 | 9/2011 | Bauer et al. | |
| 8,037,568 B2 * | 10/2011 | Lee | B60S 1/381 15/250.201 |
| 8,261,403 B2 | 9/2012 | Ehde | |
| 8,307,494 B2 | 11/2012 | Boland | |
| 8,336,158 B2 | 12/2012 | Stankiewicz et al. | |
| 8,347,449 B2 | 1/2013 | Genet et al. | |
| 8,359,701 B2 | 1/2013 | De Block et al. | |
| 8,370,987 B2 | 2/2013 | Ritt | |
| 8,402,593 B2 | 3/2013 | Boland | |
| 8,402,595 B2 | 3/2013 | Boland | |
| 8,443,483 B2 | 5/2013 | Dallos, Jr. et al. | |
| 2006/0248675 A1 | 11/2006 | Vacher et al. | |
| 2009/0199357 A1 | 8/2009 | Thienard | |
| 2011/0225761 A1 | 9/2011 | Kim | |
| 2012/0005855 A1 | 1/2012 | Egner-Walter et al. | |
| 2013/0125332 A1 | 5/2013 | Boland et al. | |

FOREIGN PATENT DOCUMENTS

| | | | |
|---|---|---|---|
| WO | 2008076088 A1 | | 6/2008 |
| WO | 2010062125 A2 | | 6/2010 |
| WO | 2012033363 A2 | | 3/2012 |
| WO | 2013/098083 | * | 7/2013 |
| WO | 2014122113 A1 | | 8/2014 |

* cited by examiner

WINDSCREEN WIPER DEVICE

CROSS-REFERENCE TO RELATED APPLICATION

This application claims the benefit of U.S. Provisional Patent Application Ser. No. 61/900,667, filed Nov. 6, 2014, entitled "Windscreen Wiper Device", the entire disclosure of the application being considered part of the disclosure of this application and hereby incorporated by reference.

BACKGROUND OF THE INVENTION

1. Field of the Invention

This application relates generally to windscreen wiper devices for vehicles.

2. Related Art

Conventional-style wiper blades typically include a frame-like superstructure which includes a plurality of reciprocating yokes which are configured to bias the length of a wiper element against a curved windshield. Such conventional-style wiper blades may be detrimental in icy conditions because ice or other debris can form or otherwise get caught in the superstructure, thereby compromising the superstructure's ability to bias the wiper element against the curved windshield, which will diminish wiping performance. One approach some wiper blade manufacturers have taken to solving this problem of reduced performance in icy conditions is to place a cover or shroud around the superstructure to protect it from ice.

As an alternative to the conventional blade with a shroud approach, wiper blade manufacturers have developed beam-style wiper blades which utilize a pre-curved carrier of a spring-like material for biasing the length of the wiper element against the windshield rather than the superstructure found on conventional-style wiper blades. Such beam-style blades typically also include a spoiler which is shaped for improving the seal between the wiper element and the windshield while the vehicle is travelling at speed. However, there remains the problem of selecting what material to be used for the spoiler. A relatively softer material may allow for sufficient flexibility of the carrier and the wiper element but may be susceptible to damage from ice scrapers or other ice formation in cold conditions. On the other hand, a relatively harder material might be resistant to damage but may impede flexing of the carrier and wiper element, thereby compromising the performance of the wiper blade.

SUMMARY OF THE INVENTION AND ADVANTAGES

An improved beam-style windscreen wiper device is provided which includes a spoiler that may be formed of a relatively soft material that allows for improved flexibility of the carrier and wiper element but has improved resistance to damage while remaining cost effective.

According to one aspect of the present invention, the windscreen wiper device includes a longitudinally extending wiper element which is made of an elastic rubber or rubber-like material. The windscreen wiper device additionally includes a carrier which supports the wiper element and is curved in a longitudinal direction and operably biases the wiper element into a curved shape. The carrier has side edge portions which project laterally outwardly of the wiper element. A connecting device is engaged with the carrier for connection with a wiper arm of a vehicle. End caps are disposed at opposite longitudinal ends of the carrier and are spaced longitudinally from the connecting device. A pair of subspoilers, which are formed as separate pieces from the wiper element are disposed on opposite longitudinal sides of the connecting device. Each of the subspoilers includes a bottom wall and a front wall and a back wall and presents an open interior bounded by the bottom, front and back walls. Each of the subspoilers further includes at least one reinforcing member which extends through the open interior and divides the open interior into at least two chambers for reinforcing the front and back walls. The front, back and bottom walls and the at least one reinforcing member are all formed as one integral piece.

According to another aspect of the present invention, at least one of the chambers has the shape of an at least five sided polygon when in a relaxed state.

According to yet another aspect of the present invention, the at least one reinforcing member is a pair of reinforcing members with one reinforcing member extending from the bottom wall to the front wall and the other reinforcing member extending from the bottom wall to the back wall.

According to still another aspect of the present invention, the at least one reinforcing member includes a first reinforcing member which extends from the bottom wall to the front wall and a second reinforcing member which extends from the back wall to the first reinforcing member. The second reinforcing member extends through an angle and wherein one of the chambers is generally honeycomb shaped and is bound by the front and back walls and the first and second reinforcing members.

According to a further aspect of the present invention, the wiper element includes an upper holding part and a lower wiping part which are separated from one another by a hinge and wherein the upper holding part or the lower wiping part includes a pair of wings which extend towards the other of the upper holding part or the lower wiping part for protecting the hinge from external elements, such as ice.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a first exemplary embodiment of a beam-style windscreen wiper device or a wiper blade assembly 20 with improved performance and resistance to damage when used in cold and icy conditions is generally shown in FIGS. 1-8.

Figure 1:
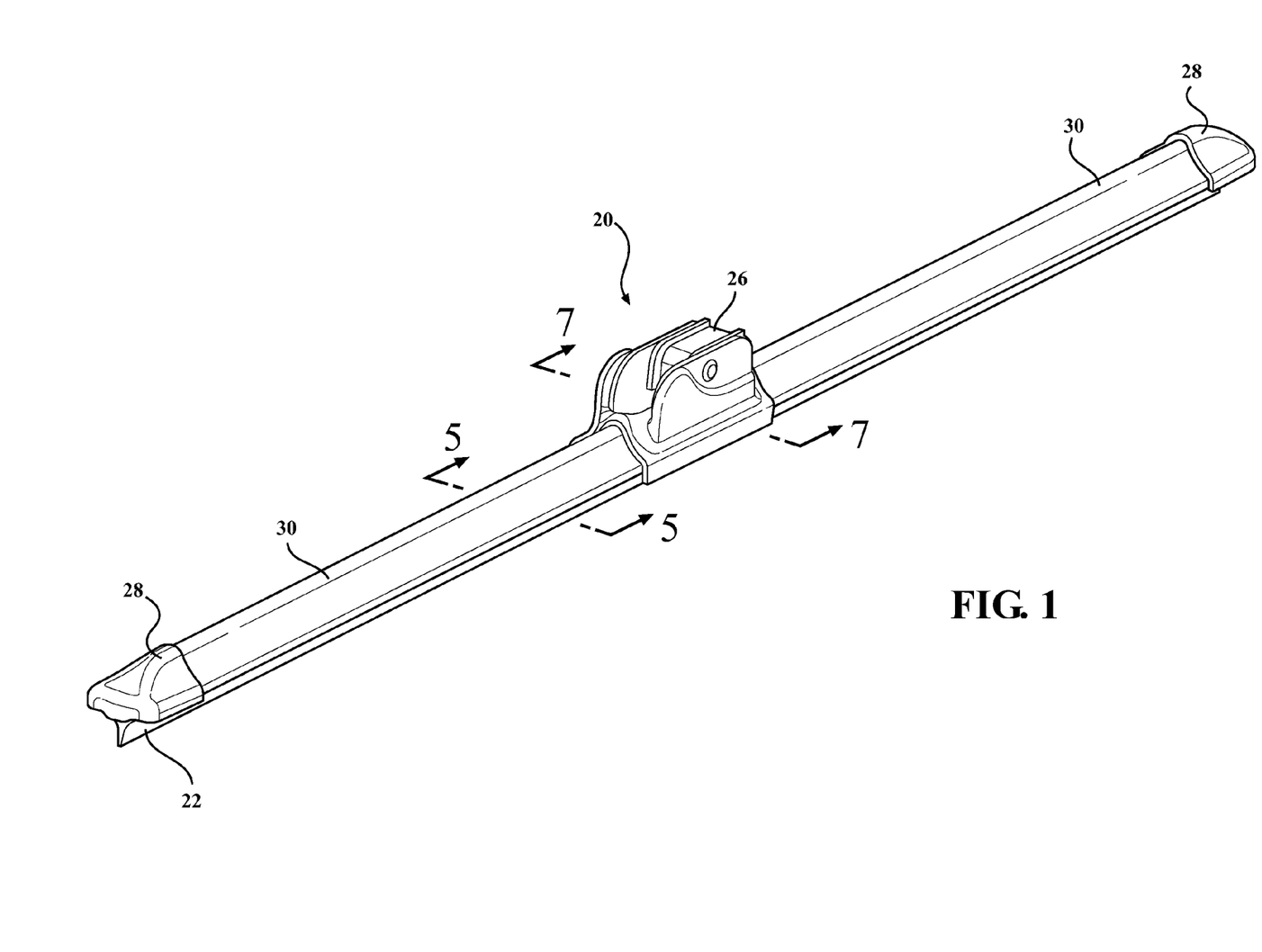
FIG. 1 is a perspective elevation view of a first exemplary embodiment of the wiper blade assembly.
Figure 2:
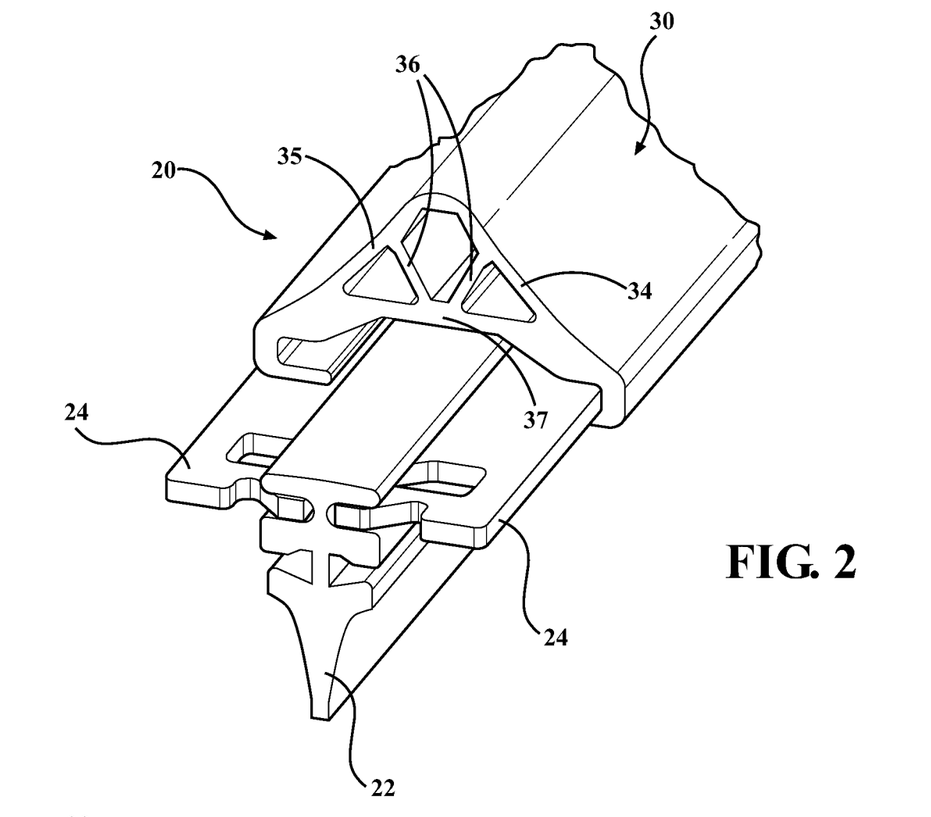
FIG. 2 is a perspective and fragmentary view of a portion of the wiper blade assembly of FIG. 1 with an end cap removed.
Figure 3:
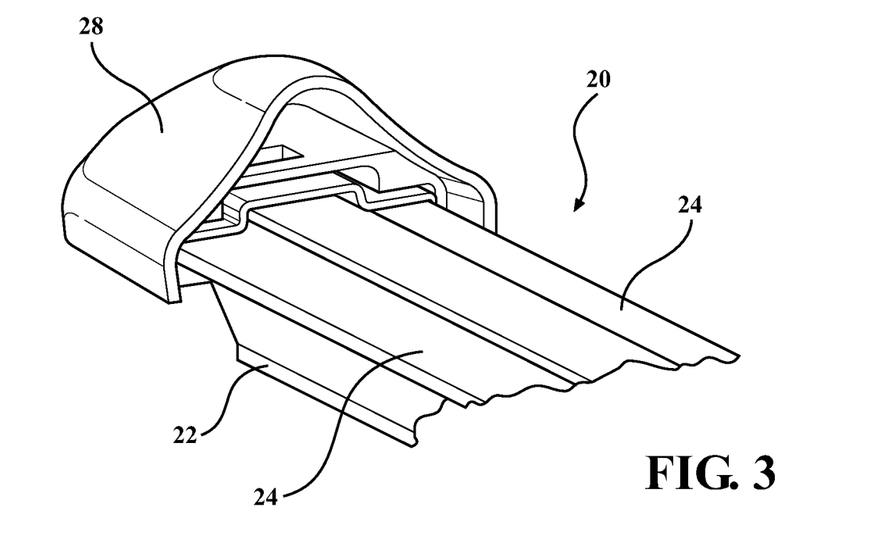
FIG. 3 is a perspective and fragmentary view of a portion of the wiper blade assembly of FIG. 1 with a subspoiler removed.
Figure 4:
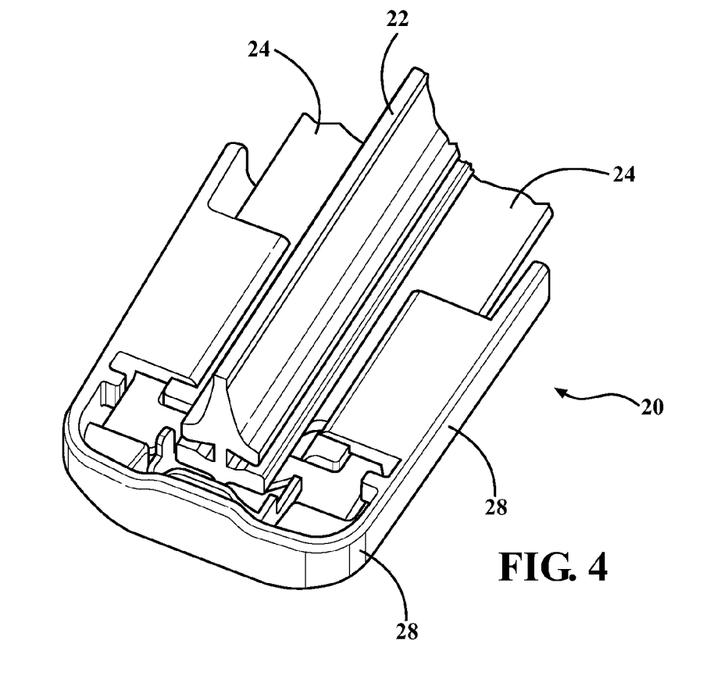
FIG. 4 is another perspective and fragmentary view of a portion of the wiper blade assembly of FIG. 1 with the subspoiler removed.

The exemplary wiper blade assembly 20 includes a wiper element 22 which is made of a flexible rubber material for sealing against a windshield (not shown) of a vehicle (not shown) to clear water, ice and other debris from the windshield. As best shown in FIG. 2, the wiper element 22 extends in a longitudinal direction and has a pair of opposing and laterally facing grooves which extend along the longitudinal length of the wiper element 22. A carrier supports the wiper element 22 and operably biases the wiper element 22 into a curved shape when in a resting or non-stressed condition for sealing the length of the wiper element 22 against a curved windshield of a vehicle. In the exemplary embodiment, the carrier includes a pair of longitudinal strips (also known as flexors 24) which are made of an elastic material, such as spring steel, and are disposed in the grooves of the wiper element 22. The flexors 24 have opposing edge portions which extend laterally outwardly from the grooves on either side of the wiper element 22. Referring back to FIG. 1, a connecting device 26 is engaged with the edge portions of the flexors 24 at approximate longitudinal midpoints of the flexors 24 for connecting the wiper blade assembly 20 with an oscillating wiper arm (not shown) on a vehicle (not shown). Neighboring ends of the flexors 24 are interconnected with one another through end caps 28. In the exemplary embodiment, the carrier includes two flexors 24. However, it should be appreciated that only one or three or more flexors could alternately be employed to support the wiper element. The connecting device 26 may have any suitable shape for connecting with any suitable style of wiper arm.

The wiper blade assembly 20 also includes a pair of subspoilers 30 which are engaged with the opposite lateral edges of the flexors 24. The subspoilers 30 extend longitudinally between the connecting device 26 and the respective end caps 28 and are shaped for applying an aerodynamic force onto the wiper element 22 when the vehicle is travelling at speed to improve the seal between the wiper element 22 and the windshield, i.e., the subspoilers 30 prevent wind from lifting the wiper element 22 out of engagement with the windshield.

Figure 5:
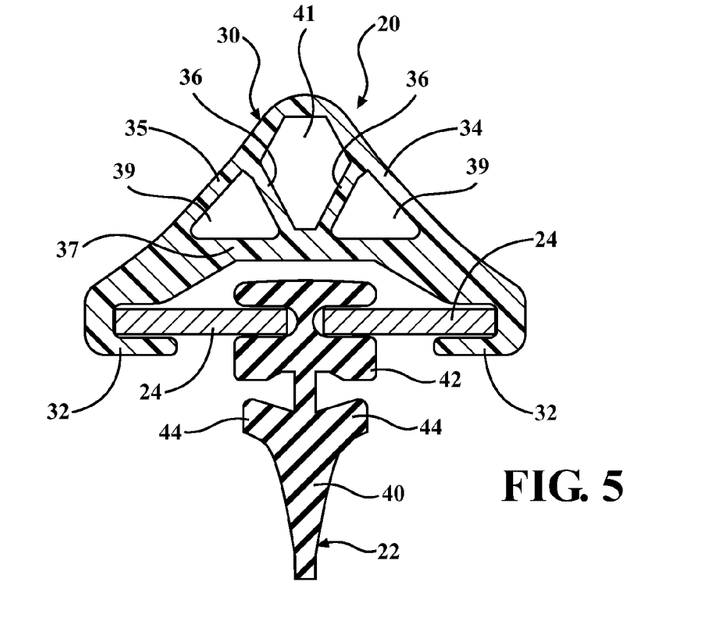
FIG. 5 is a cross-sectional view of the wiper blade assembly of FIG. 1 taken through line 5-5 of FIG. 1.

The subspoilers 30 are formed as separate pieces from one another and from the wiper element 22. As best shown in FIG. 5, when viewed in cross-section, each of the subspoilers 30 of the exemplary embodiment includes a pair of claw-shaped holding elements 32 which depend from the bottom wall 37 and wrap around the opposing lateral edges of the flexors 24 to hold the subspoilers 30 in engagement with the flexors 24. The holding elements 32 slidably engage with the flexors 24 such that the subspoilers 30 may slide in a longitudinal direction relative to the wiper element 22 and the flexors 24 in response to bending and straightening of the wiper blade assembly 20 within predetermined constraints established by the end caps 28 and by the connecting device 26. This allows for an improved seal between the wiper element 22 and the curved windshield of the vehicle while the wiper blade assembly 20 bends and straightens while sweeping back and forth along the windshield.

The subspoilers 30 are formed of a resilient but tough material, such as a hard rubber. As shown in FIG. 5, when viewed in cross-section, each subspoiler 30 in the first exemplary embodiment has an outer surface which has a symmetrical shape about a plane which extends in the longitudinal and vertical directions for applying an aerodynamic downforce onto the flexors 24 and ultimately onto the wiper element 22 while the vehicle is travelling at speed. In the exemplary embodiment, the outer surface has hydrophobic properties (such as provided by a material or a microtextured surface) for repelling water to reduce or substantially entirely eliminate the buildup of ice on the subspoilers 30.

Referring still to FIG. 5, the exemplary subspoiler 30 is of one integral piece and has a structural geometric core with a front wall 34, a back wall 35 and a bottom wall 37 which surround an open interior. In the exemplary embodiment, the bottom wall 37 has a groove which extends upwardly from a bottom surface thereof for accommodating a top end of the wiper element 22.

In the exemplary embodiment, the subspoiler 30 further includes pair of struts or reinforcing members 36 which are formed integrally with the front, back and bottom walls 34, 35, 37 and which divide the open interior into three chambers 39, 41. The exemplary reinforcing members 36 diverge laterally away from one another in a vertically upward direction from a lateral midpoint of the bottom wall 37 and are joined with the front and back walls 34, 35 on either lateral side of the apex of the subspoiler 30. This provides the subspoiler 30 with, as viewed in cross-section, a pair of generally triangularly-shaped chambers 39 disposed on either lateral side of a honeycomb or hexagonally-shaped 41. The subspoilers 30 have a similar cross-sectional shape which is generally constant along their longitudinal lengths to allow the subspoilers 30 to be made through an extrusion process. However, any suitable manufacturing process could alternately be employed.

In operation, the open interior and the reinforcing members 36 allow for the front and back walls 34, 35 of the subspoilers 30 to be made of a relatively softer material and to resiliently and elastically flex and absorb impacts from objects, such as chunks of ice or ice scrapers, without damage. Providing the subspoilers 30 with honeycomb-shaped chamber 41 has proven to be particularly effective at resisting damage. The reinforcing members 36 provide additional stiffness to the front and back walls 34, 35 for controllably harnessing this resilient deformation.

Figure 6A:
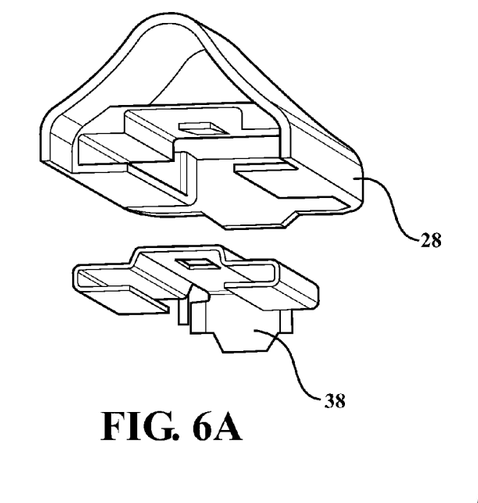
FIGS. 6A, 6B and 6C show the sequential steps of placing an insert into an end cap and connecting the insert and end cap into engagement with the flexors of the wiper blade assembly of FIG. 1.
Figure 6B:
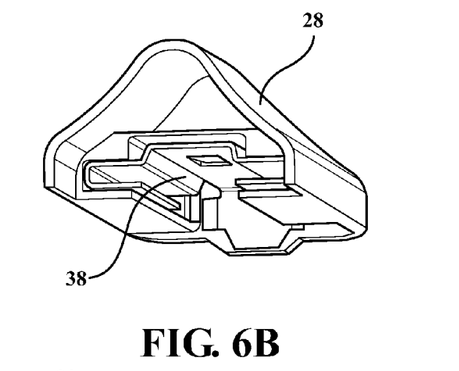
Figure 6C:
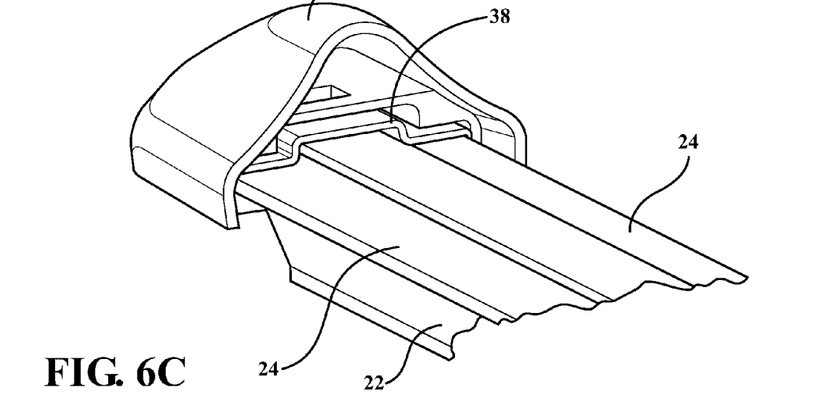

Referring now to FIG. 6A-6C, inserts 38 are positioned within the end caps 28 of the exemplary embodiment of the wiper blade assembly 20 for holding the flexors 24 together in the event of an ice chunk, an ice scraper or any other object separating the associated end cap 28 from the wiper blade assembly 20. Each insert 38 fits within a similarly-shaped opening in the corresponding end cap 28 and engages the neighboring ends of the flexors 24. The inserts 38 are very low profile such that it is highly unlikely that whatever caused detachment of the end cap 28 would also cause detachment of the insert 38. In the exemplary embodiment, the inserts 38 are made of a corrosion-resistant metal, such as stainless steel.

Figure 7:
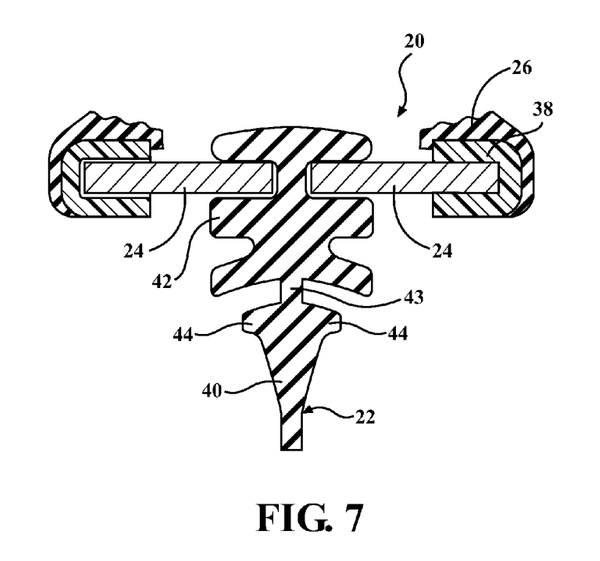
FIG. 7 is a cross-sectional view of the wiper blade assembly taken through line 7-7 of FIG. 1.

Referring now to FIG. 7, the exemplary connecting device 26 is formed of a thermoplastic material and includes a metal insert 38 for providing increased strength to the connecting device 26 while allowing for improved flexor 24 movement.

Figure 8:
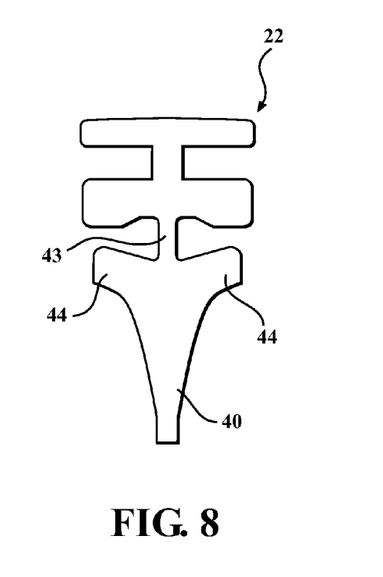
FIG. 8 is a cross-sectional view of a wiper element of the wiper blade assembly of FIG. 1.

Referring now to FIG. 8, as viewed in cross-section, the wiper element 22 has a lower wiping part 40 and an upper holding part 42. The upper holding part 42 is provided with the aforementioned grooves which receive the flexors 24 (shown in FIGS. 2 and 3-5) to support the wiper element 22. The lower wiping part 40 and the upper holding part 42 are integrally connected with one another at a hinge 43 which allows the lower wiping part 40 to articulate back and forth when the wiper blade assembly 20 is moved back and forth across the windshield of the vehicle to improve the seal between the wiper element 22 and the windshield. The lower wiping part 40 is further provided with wings 44 which extend vertically upwardly towards the upper holding part 42 for restricting the access of ice or other debris into the hinge 43 area, thereby further improving the performance of the wiper blade assembly 20 in cold or icy environments. As shown, the wings 44 diverge away from one another towards the upper holding part 42.

Figure 9:
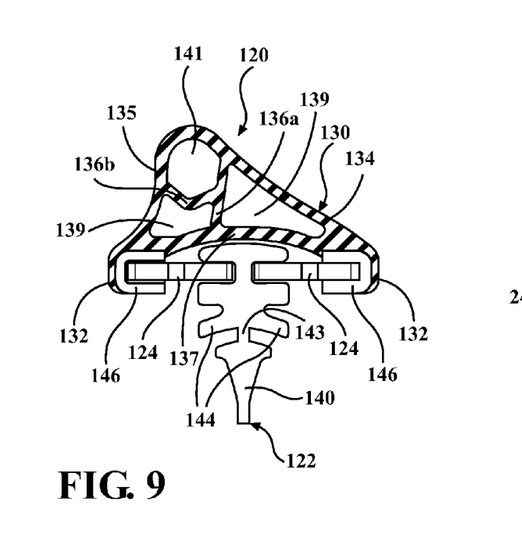
FIG. 9 is a cross-sectional view of a second exemplary embodiment of a wiper blade assembly.

Referring now to FIG. 9, a second exemplary embodiment of the wiper blade assembly 120 is shown in cross-section with like numerals, separated by a factor of 100, indicating corresponding parts with the above-described embodiment. In contrast to the first exemplary embodiment discussed above, in this exemplary embodiment, the subspoiler 130 is non-symmetrical about the vertical and longitudinal plane. The reinforcing members 136a, 136b in the open interior are arranged such that a first reinforcing member 136a extends in a generally vertical direction between the bottom wall 137 of the subspoiler 130 to the front wall 134 and a second reinforcing member 136b extends from the back wall 137 to the first reinforcing member 136a. The second reinforcing member 136b is generally L-shaped (i.e., extends through an angle) to present a generally honeycomb or hexagonally-shaped chamber 141 in the subspoiler 130 which is bound by the front wall 134, the back wall 135, the first reinforcing member 136a and the second reinforcing member 136b. This particular configuration has been found to provide the subspoiler 130 with a high stiffness and resistance to deformation or damage in response to impacts from objects such as ice, ice scrapers, and other debris.

The second exemplary embodiment of the subspoiler 130 is also distinguished from the first exemplary embodiment described above by including reinforcing pieces 146 in the holding elements 132 for strengthening the connection between the subspoiler 130 and the flexors 124. The reinforcing pieces 146 could be made of, for example, a thermoplastic material that is co-extruded with the material of the other portions of the subspoiler 130.

Figure 10:
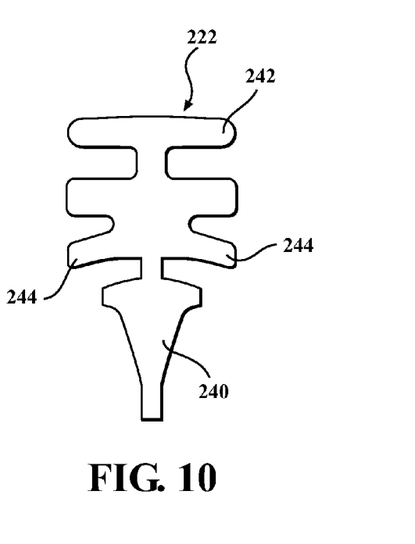
FIG. 10 is a cross-sectional view of an alternate embodiment of the wiper element.

An alternative embodiment of the wiper element 222 is generally shown in FIG. 10 with like numerals, separated by a factor of 200, indicating corresponding parts with the first exemplary embodiment described above. The wiper element 222 of this embodiment is distinguished from the first embodiment described above by the wings 244 being provided in the upper holding part 242 rather than in the lower wiping part 240 and sloping generally downwardly rather than upwardly.

Obviously, many modifications and variations of the present invention are possible in light of the above teachings and may be practiced otherwise than as specifically described while within the scope of the appended claims.

What is claimed is:

1. A windscreen wiper device, comprising:
a longitudinally extending wiper element of an elastic material;
a carrier supporting said wiper element and curved in a longitudinal direction and operably biasing said wiper element into a curved shape, said carrier having side edge portions which project laterally outwardly of said wiper element;
a connecting device engaged with said carrier for connection with a wiper arm of a vehicle;
end caps disposed at opposite ends of said carrier and spaced longitudinally from said connecting device;
a pair of subspoilers formed as separate pieces from said wiper element and disposed on opposite longitudinal sides of said connecting device;
each of said subspoilers including a bottom wall and a front wall and a back wall and presenting an open interior bounded by said bottom, front and back walls;
each of said subspoilers further including at least one reinforcing member extending through said open interior and dividing said open interior into at least two chambers for reinforcing said front and back walls and wherein at least one of said chambers has a shape of an at least five sided polygon when in a relaxed state; and
wherein said front, back and bottom walls and said at least one reinforcing member of each subspoiler formed as one integral piece.

2. The windscreen wiper device as set forth in claim 1 wherein said at least one reinforcing member is further defined as being a pair of reinforcing members.

3. The windscreen wiper device as set forth in claim 2 wherein one of said reinforcing members extends from said bottom wall to said front wall and wherein the other of said reinforcing members extends from said bottom wall to said back wall.

4. The windscreen wiper device as set forth in claim 2 wherein one of said reinforcing members is a first reinforcing member which extends from said bottom wall to said front wall and wherein the other of said reinforcing members is a second reinforcing member which extends from said back wall to said first reinforcing member.

5. The windscreen wiper device as set forth in claim 4 wherein said second reinforcing member extends through an angle and wherein one of said chambers is generally honeycomb-shaped and is bound by said front wall, said back wall, said first reinforcing member and said second reinforcing member.

6. The windscreen wiper device as set forth in claim 1 wherein said subspoilers are made of a resilient polymeric material.

7. The windscreen wiper device as set forth in claim 1 wherein said front and back walls have an outer surface with a hydrophobic texture.

8. The windscreen wiper device as set forth in claim 1 wherein said end caps are made of a polymeric material and wherein each of said end caps includes a metal insert.

9. The windscreen wiper device as set forth in claim 1 wherein said carrier includes a pair of flexors.

10. The windscreen wiper device as set forth in claim 1 wherein each of said subspoilers includes a pair of holding elements which depend from said bottom wall and engage around said side edge portions of said carrier.

11. The windscreen wiper device as set forth in claim 1 wherein said wiper element includes an upper holding part and a lower wiping part which are separated by a hinge and wherein said upper holding part or said lower wiping part includes a pair of wings which extend towards the other of said upper holding part and said lower wiping part for protecting said hinge.

12. The windscreen wiper device as set forth in claim 11 wherein said wings are on said lower wiping part and extend towards said upper holding part.

13. The windscreen wiper device as set forth in claim 1 wherein said subspoilers are generally symmetrical about a longitudinally extending plane.

14. The windscreen wiper device as set forth in claim 1 wherein said subspoilers are asymmetrical about a longitudinally extending plane.

* * * * *